Patented May 8, 1928.

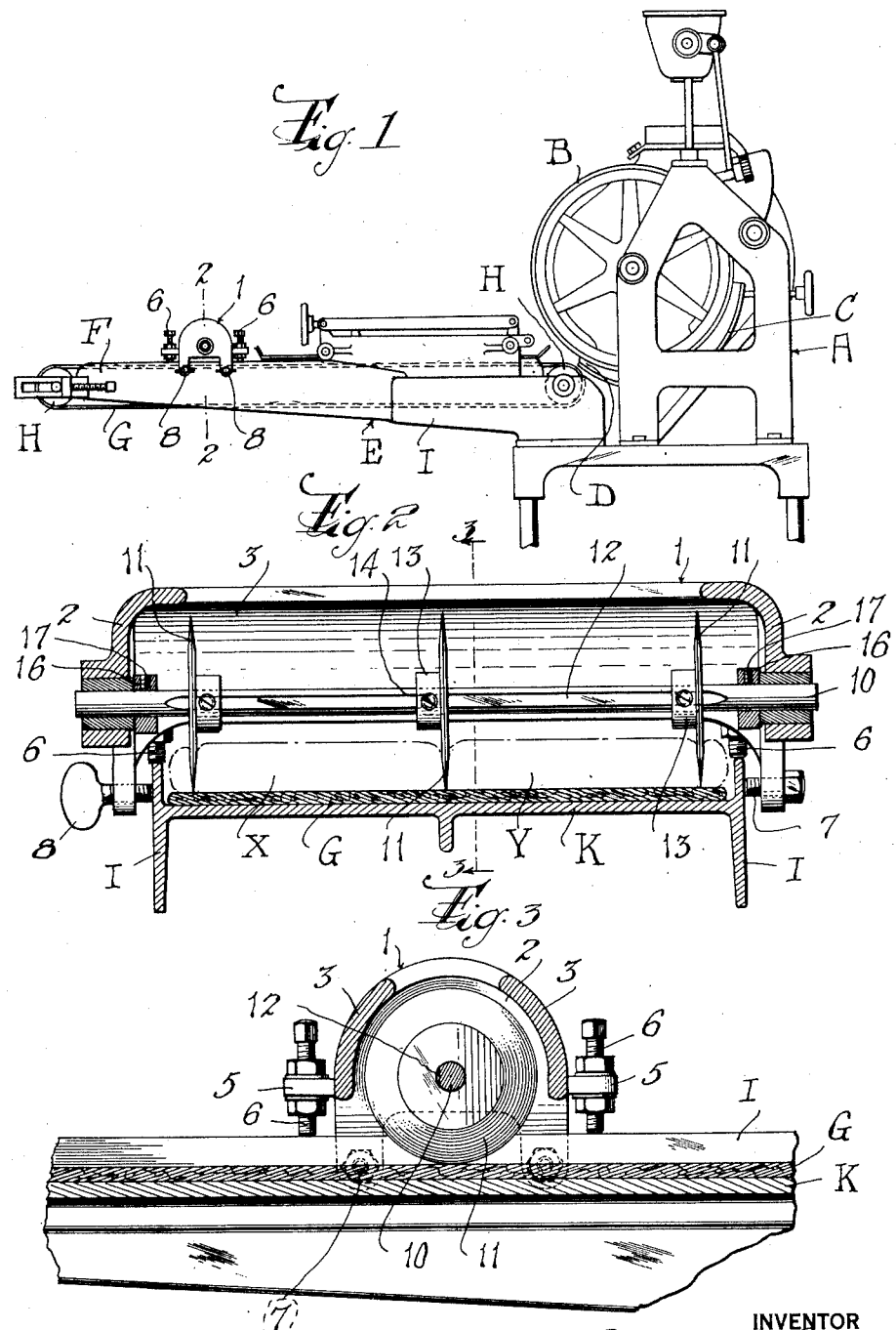

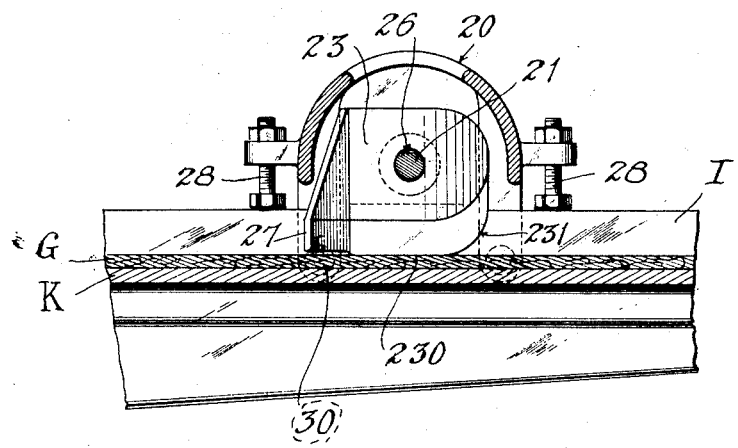

1,668,819

UNITED STATES PATENT OFFICE.

EDWARD T. PARSONS, OF UPPER MONTCLAIR, NEW JERSEY, ASSIGNOR TO THOMSON MACHINE COMPANY, A CORPORATION OF NEW JERSEY.

ADJUSTABLE BLADE-ROLL CUTTER.

Application filed July 7, 1926. Serial No. 120,883.

This invention relates to a device for cutting a lump of dough into a plurality of pieces, and more particularly to a device for dividing a long cylindrical roll of dough to form rolls.

One object of the invention is to provide a device of the character described which may be used in combination with a dough moulder, conveyor or roll extender and embodying novel and improved features of construction including rotary or stationary blades or cutters and means for accurately adjusting said blades or cutters to completely sever the roll of dough without injury to the cutters or the dough support each by the other.

Another object is to provide such a device including novel and improved means for mounting the blades or cutters upon a dough support or conveyor.

Other objects are to provide a device of this character having a casing or frame to be removably mounted on the frame of a dough moulder, conveyor or roll extender, and blades or cutters mounted in said casing, whereby said device constitutes a unit which may be selectively used with different dough working machines and accurately adjusted to cooperate therewith; to provide novel and improved means for adjusting the cutters or blades of a dough cutting device relatively to each other to vary the lengths of the pieces into which the lump or roll of dough is to be cut; to provide a novel and improved combined cutter or blade and a deflector for severed pieces of dough for use in a dough cutting device; to provide a dough cutting device which is simple and inexpensive, and to obtain other results and advantages as may be brought out by the following description.

Referring to the accompanying drawings, in which I have illustrated a preferred embodiment of the invention and wherein corresponding and like parts are designated by the same reference characters throughout the several views, Figure 1 is an end elevation of an adjustable blade roll cutter showing it applied to a conveyor attachment for a dough moulding machine;

Figure 2 is an enlarged vertical longitudinal sectional view through the device, taken on the line 2—2 of Fig. 1;

Figure 3 is a transverse vertical sectional view, taken on the line 3—3 of Fig. 2;

Figure 4 is a view similar to Fig. 2 showing another form of the invention, and

Figure 5 is a view similar to Fig. 3, taken on the line 5—5 of Fig. 4.

Specifically describing the embodiment of the invention illustrated in Figures 1–3 inclusive of the drawings, the reference character A designates a dough moulding machine of known type, for example as described in Patent No. 1,542,833 dated June 23, 1925, for forming rolls, and including a kneading drum B and compression plate C between which a lump of dough is moulded or shaped into a cylindrical piece and from which said piece is discharged at D. A horizontal conveyor E comprising a frame F and a movable part such as an endless belt G traveling on rollers H is mounted upon the machine A to receive and convey away the roll of dough as it is discharged, said frame F having substantially parallel side pieces I and a table portion K underlying and supporting the upper reach of the belt G. This construction is known in the art and no claim to novelty is made thereon.

It is desired to sever a cylindrical piece of dough indicated by dot and dash lines on Figure 2, into several parts to form rolls, and also to so sever said piece of dough that each part has "raw" ends or ends not coated with a film or "skin" of flour. The cylindrical piece of dough is deposited upon the upper reach of the conveyor belt transversely thereof and is moved by the belt away from the machine A, and a cutting device is mounted upon the conveyor frame to cut said piece of dough as it is so moved. This cutting device comprises a housing 1 having end walls 2 integrally connected by side walls 3, and said end walls are spaced apart a distance greater than that between the side pieces I of the conveyor frame F so as to receive said conveyor frame between them as shown in Figure 2. Adjacent the end walls 2, the side walls 3 of the housing 1 are provided with laterally projecting lugs 5 in which are adjustably fitted set screws 6 to serve as feet to bear upon the tops of the side pieces I of the conveyor frame and support the housing thereon, and the end walls 2 are provided with inwardly projecting abutments 7 and clamping screws 8 to engage the outer surfaces of the respective side pieces I, the clamping screws 8 preferably having wing heads to facilitate in adjusting the screws. With this construction, the housing 1 may be mounted on the conveyor frame transversely thereof in straddling relation with the set screws 6 serving as feet and the clamping screws 8 cooperating with the abutments 7 to fasten the housing against movement on the conveyor frame.

A rotatable shaft 10 is journaled in said end walls 2, and a plurality of circular blades 11 are mounted on said shaft so as to rotate therewith and be adjustable longitudinally thereof. In the present instance there are three blades one disposed centrally of the length of said shaft and so as to be centrally arranged with respect to the width of the conveyor belt G when the housing is mounted on the conveyor, the other blades being equidistantly spaced from the first-mentioned blade and so as to be in the path of movement of the piece of dough adjacent its ends when the housing is on the conveyor frame. Preferably the shaft 10 has a longitudinal flat surface 12 and the blades 11 have hubs 13 slidable on the shaft and in which are fitted set screws 14 to engage said flat surface and hold the blades fast on said shaft. Collars 16 may be secured by set screws 17 on the shaft 10 to abut the insides of the end walls 2 and hold the shaft against longitudinal movement in the housing.

In operation of the device the housing 1 is adjusted on the conveyor frame F by the set screws 6 so that the blades 11 barely touch the top side of the upper reach of the conveyor belt G. The cylindrical piece of dough to be divided is moved by the conveyor belt G beneath the blades 11, and the influence of the conveyor on the dough resisted by the blades results in the piece of dough and the blades being simultaneously rotated, which in conjunction with the curved edges of the blades causes the piece of dough to be severed with a shearing action and with a minimum of distortion or squeezing of the dough adjacent the cutters. The center blade cuts the piece of dough into two pieces and the end cutters sever both ends of the piece so that two rolls X and Y are produced each having both ends "raw cut".

In the form of the invention shown in Figures 4 and 5 of the drawings, the housing 20 may be substantially identical with the housing 1, but the shaft 21 is held against rotation by set screws 22. Instead of rotating dough cutting blades, I may utilize stationary blades 23 adjustable longitudinally upon the shaft 21 by hubs 24 and set screws 25 to engage a flat surface 26 on the shaft, similar to the hubs 13, set screws 14 and flat surface 12 above described. The blades 23 have straight cutting edges 230 adapted to be arranged substantially parallel with and barely touching the conveyor belt G, said straight edges merging into curved cutting edges 231 diverging from the conveyor belt to be initially engaged by the piece of dough to be cut. The end blades are formed on their outer sides at their rear edges with laterally and rearwardly inclined wings 27 which serve to deflect the end pieces of dough off to the corresponding sides of the conveyor belt and away from the main parts X and Y.

The use and operation of this form of the invention is otherwise substantially identical with that shown in Figures 1 to 3 inclusive, the housing 20 being similarly mounted on the conveyor frame and adjusted by the set screws 28 to properly locate the cutting edges of the blades with respect to the conveyor belt, and the clamping screws 29 and abutments 30 serving to fasten the housing in this position. The piece of dough is divided with a shearing action to form two parts each with "raw" cut ends, the blades 23 being stationary and the piece of dough being moved against them by the conveyor belt.

It will be observed that the axes of the clamping screws 8 and 29 and the respective abutments 7 and 30 are at right angles to the axes of the respective foot screws 6 and 28, and that said foot screws 6 and 8 are longitudinally movable in planes substantially parallel to the planes of the cutting blades 11 and 23 respectively, and toward and from the dough moving part of the dough handling machine.

While I have shown the invention as used in connection with only one type of dough handling machine and embodying certain details of construction, this is primarily for illustrating the principles of the invention, and obviously the invention is equally susceptible of use with other types of machines and the details of construction may be modified and changed by those skilled in the art without departing from the spirit or scope of the invention. Therefore, I do not desire to be understood as limiting myself except as required by the following claims when construed in the light of the prior art.

Having thus described the invention, what I claim is:

1. A dough cutting device comprising a frame constructed to straddle the frame of a dough handling machine which includes a movable part for moving a piece of dough through said machine, adjustable means on the first-mentioned frame to engage the top of the frame of said dough handling machine, a cutting blade on the first-mentioned frame to sever a piece of dough as it is moved through said machine, said adjusting means permitting adjustment of the first-mentioned frame on the frame of said dough handling machine to vary the relation of said cutting blade and said movable part of said machine, and clamping means on the first-mentioned frame to engage the sides of said frame of said dough handling machine to hold said first-mentioned frame against movement on said machine.

2. A dough cutting device comprising a frame to be mounted on a dough handling machine, a cutting blade mounted on said frame, means on said frame adjustable in planes parallel to the plane of said cutting blade to engage said dough handling machine, and clamping means on said frame movable in planes at substantially right angles to the planes of movement of the last-mentioned means for securing said frame against movement on said dough handling machine.

3. The combination with a dough handling machine, including a movable part for moving a piece of dough through said machine, of a cutting blade mounted to sever a piece of dough as it is moved through said machine, said blade being provided with means for laterally deflecting a severed piece of dough on said movable part.

4. The combination with a dough handling machine including a movable part for moving a piece of dough through said machine, of a cutting blade mounted to sever a piece of dough as it is moved through said machine, said blade being formed with a laterally inclined portion at the rear of the cutting edge thereof to deflect a severed piece of dough on said movable part.

5. The combination with a dough molding machine which includes a frame and a movable part for moving a piece of dough through the machine, of a dough cutting device comprising a frame to be removably mounted upon said dough handling machine adjacent said movable part, adjustable means on said second-mentioned frame to engage the first-mentioned frame whereby the second-mentioned frame may be adjusted relatively to said movable part of said machine, and a cutting blade mounted on said second-mentioned frame to sever a piece of dough as it is moved through said dough molding machine.

6. The device set forth in claim 5 with the addition of means for releasably securing said second-mentioned frame against movement on the said dough molding machine.

7. The combination with a dough molding machine which includes a frame and a movable part for moving a piece of dough through the machine, of a dough cutting device comprising a frame to be removably mounted upon said machine adjacent said movable part, a plurality of adjustable screws mounted on said second-mentioned frame to serve as feet therefor to support it on the first-mentioned frame, a cutting blade on said frame to sever a piece of dough as it is moved through said machine, said adjusting screws permitting adjustment of said frame on said machine to vary the relation of said cutting blade to said movable part of said dough molding machine, and means for clamping said second-mentioned frame against movement on said first-mentioned frame.

EDWARD T. PARSONS.